Oct. 3, 1950     L. W. ISOM     2,524,567
CONSTANT LEVEL BALLOON
Filed July 31, 1948
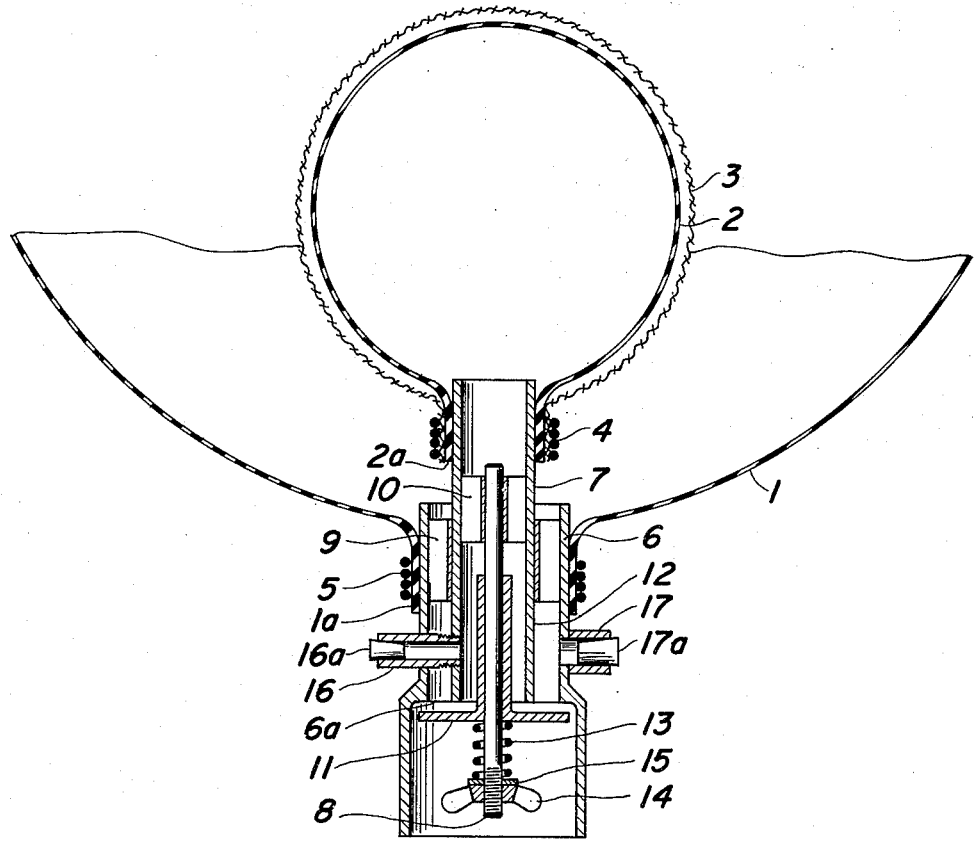
INVENTOR
Langley W Isom.
BY Theodore C. Browne
ATTORNEY Patented Oct. 3, 1950

2,524,567

UNITED STATES PATENT OFFICE 2,524,567

CONSTANT-LEVEL BALLOON

Langley W. Isom, Belmont, Mass., assignor to Dewey and Almy Chemical Company, Cambridge, Mass., a corporation of Massachusetts Application July 31, 1948, Serial No. 41,765

4 Claims. (Cl. 244—24)

This invention relates to a constant-level balloon having an elastic envelope.

Aside from important military uses, certain meteorological investigations require balloons or other devices that will stay at substantially constant altitudes over relatively long periods of time, at heights rendering captive balloons or kites unpractical. Such balloons also must often be free-flying in order that motions of air masses can be followed.

A balloon consisting of a sealed elastic envelope filled with a gas that is less dense than air will rise until the envelope bursts. With such balloons the difference between the interior and the exterior pressures is extremely small and substantially constant. When such a balloon rises, the surrounding atmospheric pressure decreases, causing the envelope to expand, for the interior pressure also decreases resulting in a corresponding increase in volume. The net result is a substantially constant lifting force, independent of altitude. The balloon rises until the envelope is expanded beyond its elastic limit, when it bursts.

A balloon consisting of a non-elastic envelope with an opening or other means of discharging gas as the atmospheric pressure decreases dissipates its lifting force as the balloon rises, due to the discharge of its gas. Such a balloon attains an altitude where the lifting force balances the load carried by the balloon.

To arrest the ascent of a balloon with an elastic envelope, gas must be removed as the balloon approaches the proper altitude. Balloons with elastic envelopes can be made considerably lighter and cheaper than can balloons of the same size with non-elastic envelopes. It is, therefore, desirable to have an elastic balloon that will maintain a constant altitude.

It is the object of my invention to produce a free-flying elastic balloon that will rise to and stay at a practically constant altitude over a relatively long period of time without unduly loading the balloon with heavy equipment.

My invention can best be explained by referring to the drawing which is a vertical section through the lowermost portions of the balloon showing, in vertical section, means for releasing gas therefrom to maintain the balloon at constant altitude. The balloon consists of an elastic envelope 1 having a neck 1a. The neck 1a is fitted around a cylindrical tube 6 which projects upward just beyond the joinder of the neck 1a with the main part of the envelope 1. The tube 6 projects beyond the lower end of the neck 1a a sufficient distance to function as herebelow described. The tube 6 is of larger internal diameter at the lower end than it is at the upper end and is provided with a planar annular transverse surface 6a at the junction of the upper narrow cylindrical section with the lower wider cylindrical section. This annular surface 6a provides a valve seat, whose function will become evident herebelow. The seizing 5 secures the tube 6 in the neck 1a. Mounted concentrically within tube 6 is tube 7, secured rigidly in place by the brackets 9 which are fastened to the exterior wall of tube 7 and the interior wall of tube 6. Tube 7 extends upward into the envelope 1 beyond the top of tube 6. The upper end of tube 7 is inserted into the neck 2a of a flexible envelope 2, which envelope 2 is completely surrounded by an inelastic fabric envelope 3. Both of these envelopes are secured to tube 7 by seizing 4 in the same manner that the envelope 1 is secured to the upper end of the tube 6. These envelopes 2 and 3 are within the envelope 1. The lower end of tube 7 is coplanar with the annular surface 6a of tube 6.

Positioned axially in the center of tube 7, by means of bracket 10, is a rod 8, threaded on its lower end. The rod 8 extends below the lower end of the interior tube 7.

Fitted around the rod 8 is a sleeve 12 and a disc 11 which is secured to the lower end of the sleeve 12. The combination of sleeve 12 and the disc 11 is free to slide along and on the rod 8. The disc 11 acts as a valve plate, closing the tubes 6 and 7 when in simultaneous contact with the lower end of tube 7 and the annular surface 6a. The sleeve 12 serves to prevent wobbling of the disc 11 and also more effectively seals the interior of tube 7 from the atmosphere than would be accomplished merely by a hole through the disc 11. The inside surface of the disc 11 may be covered with a compressible material, as rubber, to render more tight the closure of the tubes 6 and 7.

Acting upwardly against the disc 11 is a coil spring 13 which reacts against the washer 15 and a wingnut 14. The wingnut is threaded on the lower threaded portion of the rod 8, the function of said rod being solely to provide means of yieldingly holding the disc 11 against the end of tube 7 and the annular surface 6a of tube 6.

The wingnut 14 provides means for varying the force with which the disc 11 is urged against the end of tube 7 and the annular surface 6a.

The lower, wider portion of tube 6 serves to protect the valve assembly comprising the disc 11, spring 13, wingnut 14, and the lower end of the rod 8, and to protect the adjustment of the pressure of the spring 13 against the disc 11.

The separate envelopes 1 and 2 are filled through the tubes 17 and 16, respectively, which enter the tubes 6 and 7, respectively, radially so that the bores of the tubes 17 and 16 are solely in communication with the interiors of tubes 6 and 7, respectively. Tube 16 passes through the wall of tube 6 and enters tube 7 and is secured tightly to both tubes to prevent any leakage of gas through said walls of the tubes 6 and 7. Tube 17 enters through the wall of tube 6 and is sealed thereto. Tapered plugs 16a and 17a fit the interiors of tubes 16 and 17, respectively, and provide means for closing said tubes.

In operation, the compression of the spring 13 is adjusted by means of the wingnut 14 to exert just sufficient pressure against the disc 11 to close the tubes 6 and 7 against the internal pressure of the envelope 1. The envelope 1 is then filled with a suitable gas, as hydrogen or helium, by connecting a hose to the end of tube 17, which hose is also connected to a source of gas. When the envelope 1 is filled to the proper diameter, the hose is removed and the stopper 17a is inserted into the end of the tube 17.

Then through the tube 16 is introduced into the envelope 2 such a quantity of gas (air will do) as will fill the envelope 2 to the extent allowed by the restraining non-elastic envelope 3 at the altitude desired for initiating the escape of gas from the envelope 1. With this amount of air in the envelope 2, the tube 16 is plugged with the stopper 16a.

It can be readily seen that until the envelope 2 is fully distended by the expansion of the air therein, the pressure of this air is the same as the pressure of the gas within the outer envelope 1, both pressures being slightly higher than the surrounding atmospheric pressure.

As the balloon ascends, the difference between the atmospheric pressure and the internal pressures is constant, and the valve remains closed by the pressure exerted by the spring 13 against the disc 11. But when the envelope 2 has expanded to its full limit as determined by the non-elastic envelope 3, the pressure within the envelope 2 relative to the pressure within the outer envelope 1, and to the atmospheric pressure, increases. This pressure, acting against the inner surface of the disc 11 over the area closing the lower end of tube 7, causes the disc 11 to remove from contact with the end of tube 7 and simultaneously break contact with the annular surface 6a of the tube 6. Gas then escapes from the envelope 1 and also from the envelope 2. The rate of ascent is, therefore, decreased. The pressure within the envelope 2 also decreases, but as the valve closes and the balloon continues to rise to regions of lower atmospheric pressure, the relative pressure in the envelope 2 continues to increase and reopens the valve by again forcing the disc 11 away from the tube 7 and away from the annular surface 6a. This process results in continual discharge of gas from the envelope 1 and consequently in a continual decrease in the rate of ascent. It continues until sufficient gas has escaped from the envelope 1 to arrest completely the ascent of the balloon. The valve then closes permanently, for with no further ascent and corresponding decrease in atmospheric pressure the relative pressure within the envelope 2 can no longer increase.

When ascent is arrested completely in this manner, the lifting force exactly balances the load and the balloon remains at a constant altitude, except for the effect of diffusion of the gas through the envelope which can be compensated for by employing means for dropping ballast from the balloon.

It is an essential feature of my invention that the gas within the non-elastic envelope be allowed to escape when the valve is open, simultaneously with the escape of gas from the main balloon. This permits the valve to close again at a higher altitude than where it opened, by virtue of the decreased pressure within the non-elastic envelope after the escape of gas therefrom. Should the interior of the non-elastic envelope be sealed from the atmosphere when the valve is open, as where a piston within the tube 7 actuates the valve, the valve would open at some altitude determined by the amount of gas within the non-elastic envelope and the pressure exerted in opposition by the spring. The valve would not close again until the balloon dropped below the altitude at which it opened, for it is actuated solely by the relative pressure within the non-elastic envelope.

It is understood that the above description of my invention is but one of several ways of putting it into practice. The description places the non-elastic gas-containing envelope in the interior of the large main envelope, as this is a convenient and practical place for it. But it can be readily seen that this non-elastic envelope, with the surrounded bladder, could just as well be placed exterior to the main envelope without affecting the performance of my invention. Conduit means would then be necessary to conduct the pressure in the non-elastic envelope to one of the concentric tubes shown in the drawing as 6 or 7. The other tube, of course, would be in communication with the interior of the main balloon.

I claim as my invention:

1. A constant-level, free-flying balloon comprising an elastic envelope which is free to expand without restraint and is adapted to contain a lifting gas, an independent non-elastic envelope adapted to contain gas, and a valve including a single valve member operative to permit the passage of gas from the elastic envelope and from the non-elastic envelope to the atmosphere, said member being actuated solely by the pressure in the non-elastic envelope.

2. A constant-level, free-flying balloon comprising an outer elastic envelope which is free to expand without restraint and is adapted to contain a lifting gas, an inner non-elastic envelope adapted to contain gas, a valve including a diaphragm operative to permit the passage of gas from the outer and from the inner envelopes to the atmosphere, said diaphragm being actuated solely by the pressure in the inner envelope, and conduit means of applying the pressure in the inner envelope to actuate the diaphragm.

3. In a constant-level, free-flying balloon comprising an elastic envelope which is free to expand without restraint and is adapted to contain a lifting gas, the combination of an independent, non-elastic envelope adapted to contain gas, a valve adapted to permit the escape of gas from both of the envelopes, conduit means of applying the pressure within the independent non-elastic envelope to the valve to actuate the valve to permit the escape of gas from both of the envelopes to the atmosphere, and yielding means of opposing the force exerted by the pressure within the independent non-elastic envelope.

4. In a balloon comprising an elastic envelope which is free to expand without restraint and is adapted to contain a lifting gas and an interior, non-elastic envelope adapted to contain gas, a valve comprising two concentric tubes, one in communication with the interior of the outer elastic envelope, and the other in communication with the interior of the non-elastic envelope, a disc adapted to close the outer ends of both tubes, and yielding means to hold the disc against the outer ends of the tubes, the outer side of the disc being in communication with the atmosphere.

LANGLEY W. ISOM.

REFERENCES CITED

The following references are of record in the file of this patent:

UNITED STATES PATENTS

| Number | Name | Date |
|---|---|---|
| 1,729,516 | Naatz | Sept. 24, 1929 |
| 1,926,069 | Sutton | Sept. 12, 1933 |
| 2,057,194 | Kagi | Oct. 13, 1936 |

FOREIGN PATENTS

| Number | Country | Date |
|---|---|---|
| 864,950 | France | Feb. 10, 1941 |